March 6, 1951 L. H. ENOS 2,544,450
CLOSURE FOR HOLLOW PROPELLER BLADE TIPS
Filed May 9, 1946
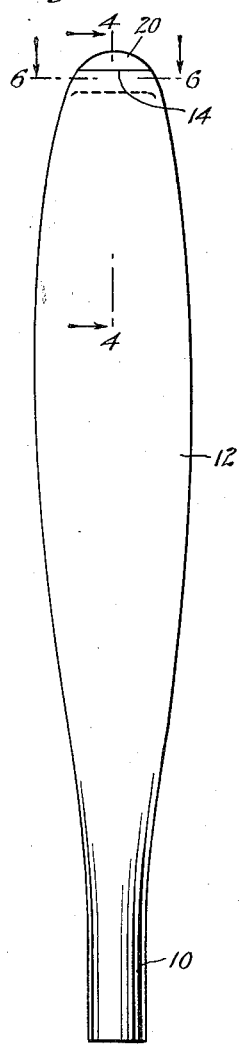
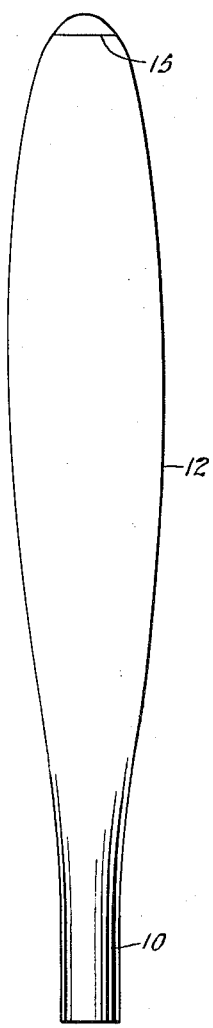
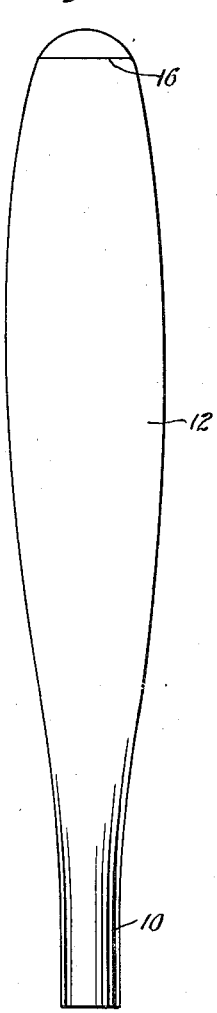
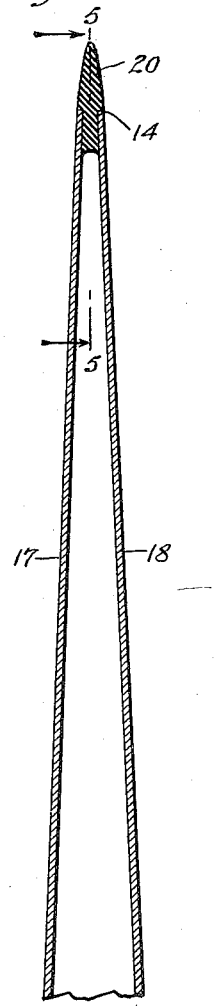
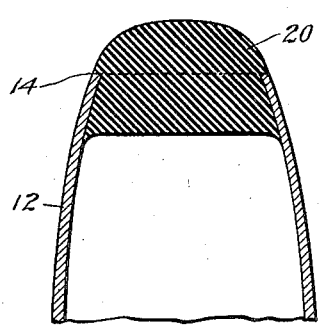
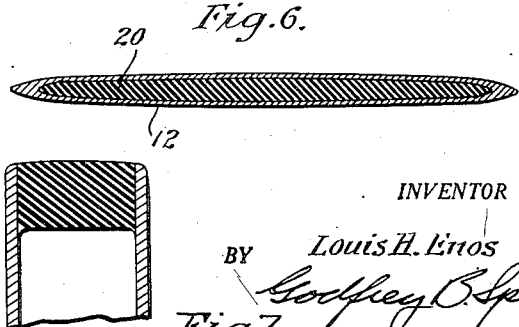
INVENTOR
Louis H. Enos
BY
ATTORNEY Patented Mar. 6, 1951

2,544,450

UNITED STATES PATENT OFFICE 2,544,450

CLOSURE FOR HOLLOW PROPELLER BLADE TIPS

Louis H. Enos, Montclair, N. J., assignor to Curtiss-Wright Corporation, a corporation of Delaware Application May 9, 1946, Serial No. 668,579

5 Claims. (Cl. 170—159)

This invention relates to improvements in aeronautical propeller blades and is concerned particularly with the provision of closures for the ends of hollow metallic blades.

In the manufacture and production of hollow metallic propeller blades, one of the methods in regular use consists in preforming steel plates to rudimentary blade form and in welding these plates together at their edges to form a propeller blade. Welding techniques used in blade manufacture must produce welds of peculiarly excellent character as compared with average welding since the stresses to which blades are subject in operation are very great and the blades must be as light as possible. While prior practice has included the closure of the tip end of the blade by welding, this has been a difficult operation and requires the preformation of the blade blank so that the thrust and camber faces of them will come together closely to enable their joinder by welding. The tip end of the blade according to my invention, need not be welded closed as in prior practice, but rather the blade end is left open and is filled by a non-metallic plug of rubber or other appropriate plastic material. The plug is molded in the blade or is preformed to fit closely to the end of the hollow blade and it can be applied to the blade more easily and cheaply than closing the blade end by welding. Furthermore, the plug closure does not detract from the structural or aerodynamic integrity of the blade.

An object of the invention is to provide a closure for the open end of a hollow metallic propeller blade of non-metallic or different material from the material of the blade proper. Further objects of the invention will become apparent in reading the detailed description and claims.

Reference may now be had to the drawings in which Figs. 1, 2 and 3 are elevations of three different forms of propeller blades;

Fig. 4 is an enlarged fragmentary section on the line 4—4 of Fig. 1;

Fig. 5 is a section on the line 5—5 of Fig. 4;

Fig. 6 is a section on the line 6—6 of Fig. 1; and

Fig. 7 is a typical blade-end section of an alternative embodiment of the invention.

Figs. 1, 2 and 3 exemplify hollow steel propeller blades of similar plan form having shanks 10 blending outwardly into blade portions 12 and terminating in ends 14, 15, and 16 respectively which lie in planes substantially normal to the longitudinal axis of each blade. The blade ends are open. In the fabrication of such blades, thrust and camber plates 17 and 18 may be welded together to form the blades, the welds being made along or adjacent to the leading and trailing edges thereof. It will be apparent that if the welds are carried from the shank portion of the blade as far as the ends 14, 15 and 16, it is unnecessary to weld around the outer end of these blades and the general direction of the welds is substantially parallel to the longitudinal axis of the blades. In prior practice when the thrust and camber plates of the blade form the closed blade tip, the welds must be carried around the end. If machine welding is used for fabricating the blades, considerable complication is introduced if the welds are to be carried around the blade tips.

In my invention, I leave the ends of the blades open. The outer ends of the blades normally will be inwardly tapered both in plan form and in section as shown in Figs. 1, 2, 3 and 4. A plug such as 20 is preformed to fit the inner surfaces of the thrust and camber plates of each blade at the tip end. The plug 20 is inserted into the hollow end of the blade and is then bonded thereto. If the plugs are made of rubber-like materials they may be vulcanized after assembly to the interior surface of the blade to provide a firm bond so that the plug is secured against removal by normal handling or by the action of centrifugal force when the blade is rotated with its hub. If the plug is made from a plastic material, it should preferably but not necessarily, have some resilience so it can be inserted in the blade end. Any suitable bonding material may be used to secure the plug in place. Alternatively, the plug may be formed or cast in the hollow blade end by well-known plastic molding processes.

The plug may extend outwardly from the blade end or it may be flush therewith. A plug flush with the end of the propeller blade is typically shown in Fig. 7. The plug is not intended to provide any actual airfoil surface or to comprise an active aerodynamic portion of the blade. Its primary function is to close the blade end against the entrance of moisture or impurities, which may induce corrosion or other damage. The closure is also desirable to suppress plate vibration in the blade.

The plug extends inwardly from the tip of the blade a short distance dictated principally by the manufacturing considerations of the area necessary for affording a proper bond of the plug to the blade material.

By utilizing the teachings of my invention, a basic hollow blade such as that shown in Fig. 2 may be cut off to provide less blade length, such cut off blades being typified by Figs. 1 and 3. Appropriate plugs can be placed in any one of the three blades of different lengths, in accordance with the width of the blade tip. Thus, a single blade form may be used to provide blades of varying length without the need of special welding techniques or fabricating processes which would otherwise be necessary to form integral closures or tips for the blade ends. Rather, the simple non-metallic plug, fitted to the blade, serves to close the blade end and to provide a finished article.

Though several embodiments illustrating the invention have been shown and described, it is to be understood that the invention may be applied in various forms. Changes may be made in the arrangements, as for instance, changing the amount of rubber which extends outwardly from the propeller tip, changing the profile of the tip both in plan form and section, changing the amount of material which protrudes into the end of the hollow blade, and changing the mode of attaching the rubber tip to the blade. Reference should be made to the appended claims for definition of the limits of the invention.

What is claimed is:

1. In combination, a hollow metallic propeller blade comprising a shell open at its outer end, and a rubber-like solid plug of yieldable material fitted within the shell at its outer end and bonded to the interior surface thereof, said plug having weatherproof and vibration damping characteristics, the latter to damp vibration of the blade plates in the tip region thereof.

2. In combination, a hollow metallic propeller blade comprising a shell open at its outer end, and a rubber-like solid plug of yieldable material fitted within the shell at its outer end and bonded to the interior surface thereof, said plug extending a short distance of less than the blade thickness beyond the end of said metallic blade, and serving both to provide a closure for said blade and to damp vibration of the blade plates in the tip region thereof.

3. A propeller blade comprising a hollow metallic blade-form shell tapering toward its outer end, the shell being open at its outer end and having airfoil cross-section, said end lying in a plane substantially normal to the blade axis, and a rubber-like vibration damping solid plug fitted within the shell at said end, the plug having cross-sectional external shape outboard of the blade end and adjacent thereto substantially the same as the blade end cross-sectional shape.

4. A propeller blade comprising a hollow metallic blade-form shell tapering toward its outer end, the shell being open at its outer end and having airfoil cross-section, said end lying in a plane substantially normal to the blade axis, and a rubber-like vibration damping solid plug fitted within the shell at said end, the plug having cross-sectional external shape outboard of the blade end and adjacent thereto substantially the same as the blade end cross-sectional shape, said plug being bonded to the blade material.

5. A propeller blade comprising a hollow metallic blade-form shell open at its outer end, the outer end thereof forming the blade tip, said blade having airfoil section throughout the outer portion thereof, the surface of said outer end lying wholly in a plane substantially normal to the blade axis, and a rubber-like vibration damping solid plug fitted within the hollow tip of said blade and secured by bonding to the inner wall of said tip, said rubber-like plug forming a tip closure for said blade and its outer end lying substantially flush with the outer end of said blade.

LOUIS H. ENOS.

REFERENCES CITED

The following references are of record in the file of this patent:

UNITED STATES PATENTS

| Number | Name | Date |
|---|---|---|
| 1,996,850 | Bendix | Apr. 9, 1935 |
| 2,152,861 | Bennett | Apr. 4, 1939 |
| 2,340,133 | Martin | Jan. 25, 1944 |
| 2,412,908 | Platt et al. | Dec. 17, 1946 |
| 2,435,604 | Rorden | Feb. 10, 1948 |

FOREIGN PATENTS

| Number | Country | Date |
|---|---|---|
| 541,759 | Great Britain | Dec. 10, 1941 |